United States Patent [19]

Nagano et al.

[11] Patent Number: 4,566,916

[45] Date of Patent: Jan. 28, 1986

[54] LOW-HYDROGEN, LOW-NITROGEN, LOW-OXYGEN WELDING FLUX

[75] Inventors: Kyoichi Nagano; Hiroshi Naganuma; Koichi Shinada; Motonori Tamura; Shigenobu Soneda, all of Sagamiharashi, Japan

[73] Assignee: Nippon Steel Corporation, Tokyo, Japan

[21] Appl. No.: 679,011

[22] Filed: Dec. 6, 1984

[30] Foreign Application Priority Data

Mar. 13, 1984 [JP] Japan .................. 59-47585

[51] Int. Cl.$^4$ ............................................. B23K 35/34
[52] U.S. Cl. ........................................ 148/26; 75/53; 75/257
[58] Field of Search ................ 75/53, 58, 257; 148/26

[56] References Cited

U.S. PATENT DOCUMENTS

| | | | |
|---|---|---|---|
| 4,207,121 | 6/1980 | Nakabayashi | 148/26 |
| 4,436,563 | 3/1984 | Tanaka | 148/26 |
| 4,437,906 | 3/1984 | Tateishi | 148/26 |

Primary Examiner—Peter D. Rosenberg

Attorney, Agent, or Firm—Wenderoth, Lind & Ponack

[57] ABSTRACT

A welding flux which forms a weld metal simultaneously satisfying low-oxygen, low-nitrogen, and low-hydrogen contents, gives weld beads in good form, and joins given metal pieces without entailing weld defects is obtained by formulating the flux in a composition such that a four-component system used therein is formed of CaO, MgO, $Al_2O_3$, and $SiO_2$ in the following proportions based on the total amount of the system taken as unity (100%), CaO: 10 to 60%
MgO: Not more than 30%
$Al_2O_3$: 20 to 70%
$SiO_2$: 5 to 40% that the total amount of the four components accounts for not less than 35% of the total weight of the flux less the $CO_2$ component thereof, that the composition incorporates therein $CaF_2$ in an amount of from 25 to 65% of the total weight of the flux less the $CO_2$ component thereof, and that the composition fulfills a specific set of other requirements, concerning a fused substance and a non-fused substance, as selected to suit the particular application in which the flux is to be used.

8 Claims, 8 Drawing Figures

LOW-HYDROGEN, LOW-NITROGEN, LOW-OXYGEN WELDING FLUX

BACKGROUND OF THE INVENTION

1. Field of the Invention

This invention relates to a flux for the submerged arc welding of steel, which satisfies the requirement that the weld metal should possess low oxygen, low nitrogen, and low hydrogen content, and materializes results in welding of steel with a weld bead of good shape and with no weld defects.

2. Description of Prior Art

For improvement of the toughness of weld metal, reduction of the oxygen content of the weld metal is one of the effective measures. In welding methods such as the submerged arc welding method which necessitates use of flux, increase of the basicity of the flux brings about an effective decrease in the oxygen content of the weld metal. With a view to enhancing the toughness of the weld metal, therefore, efforts have been made to heighten the basicity of the welding flux.

The basicity of the flux cannot be increased without entailing the various problems indicated below. With the conventional commercial fluxes, the lowest possible oxygen content of the weld metal that can be obtained at all is about 300 ppm.

The first problem is that as the basicity of flux is increased, the regulation of physical properties of flux becomes difficult, so that the form of a weld bead degrades and the weld defects such as slag inclusion and undercut occur.

The second problem is that in the case of a fused type flux which is produced by fusing raw materials for the flux as in an electric furnace, discharging the fused blend from the furnace, cooling and pulverizing it into particles of a suitable size, and drying, the flux during the course of production absorbs water such as the moisture in the ambient air, causes an increase in the amount of diffusible hydrogen in the weld metal, which induces cold cracking and pitting in the weld metal. Fluxes generally absorb water such as the moisture in the ambient air in their fused state. The ability of the fused type flux to absorb water (capacity for saturation with water) is lowest when the flux is in its neutral state, and it increases as the basicity decreases or increases from the neutrality as shown in FIG. 1. When the basicity is on the side higher than the neutrality, amount of water absorbed during the course of flux production increases in proportion to the degree of basicity. In the case of the fused type flux, therefore, the content of diffusible hydrogen in the weld metal increases in proportion as the basicity of the flux is increased for the purpose of lowering the oxygen content of the weld metal, exposing the weld metal all the more to the possibility of sustaining cold cracking and pitting.

The third problem is that when fluxes of various composition are used for welding, the nitrogen content of the weld metal increases in proportion as the oxygen content thereof decreases. One possible cause for this phenomenon is that the reaction of $C+O \rightarrow CO \uparrow$ in the molten pool decreases in consequence of the decrease in the oxygen content and the shielding action of CO serving to preclude the inclusion of ambient air (consequently nitrogen) is lowered. Another theory is that oxygen affects the mechanism of nitrogen absorption in the gas-metal boundary and the molten slag-metal boundary.

Nitrogen is known to be an element which impairs the toughness of the weld metal. The fact that the nitrogen content is increased by the measure taken to lower the oxygen content spoils the fundamental object of the measure taken to lower the oxygen content.

OBJECT OF THE INVENTION

An object of this invention is to provide a flux for the submerged arc welding of steel, which satisfies the requirement that the weld metal should possess low oxygen, low nitrogen, and low hydrogen content and results in welding of steel with weld beads of good shape and with no weld defects.

The other objects and characteristics of this invention will become apparent from the further disclosure to be made in the following detailed description of preferred embodiments, with reference to the accompanying drawings.

CONSTRUCTION AND OPERATION OF THE INVENTION

The inventors made various studies to seek in the flux composition a solution for the aforementioned various problems arising from the low-oxygen welding by use of a flux of high basicity. They have consequently acquired a knowledge described below.

Figure 1:
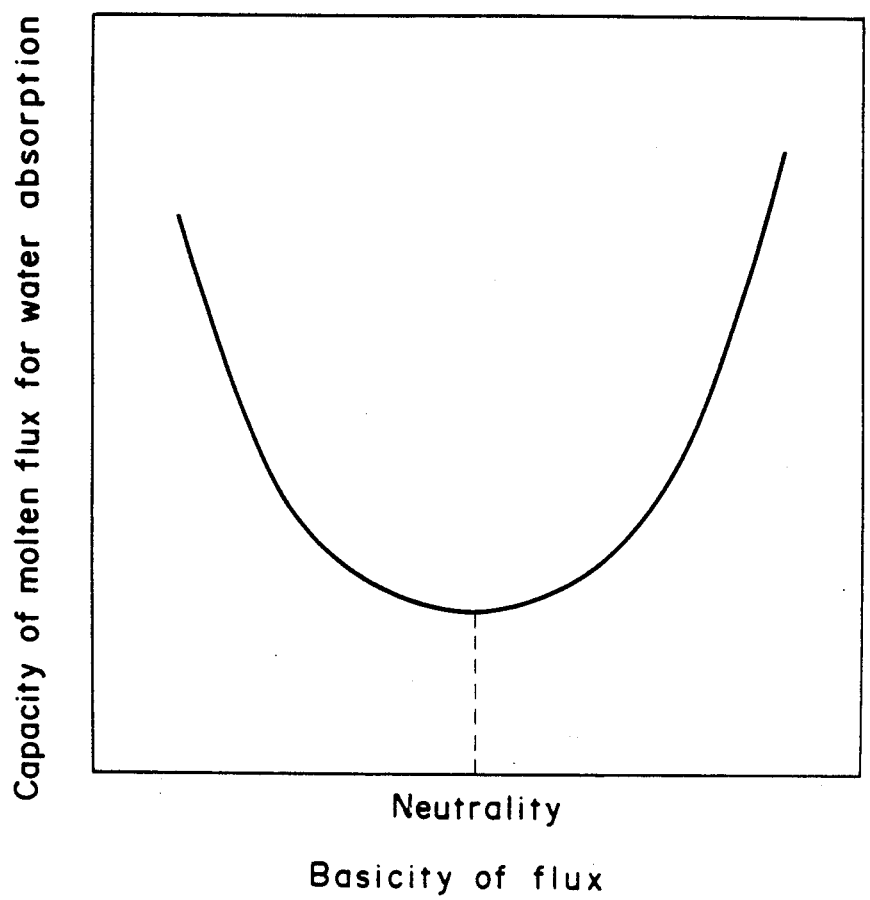
FIG. 1 is a diagram showing the basicity vs. the capacity for water absorption of molten flux.
Figure 2:
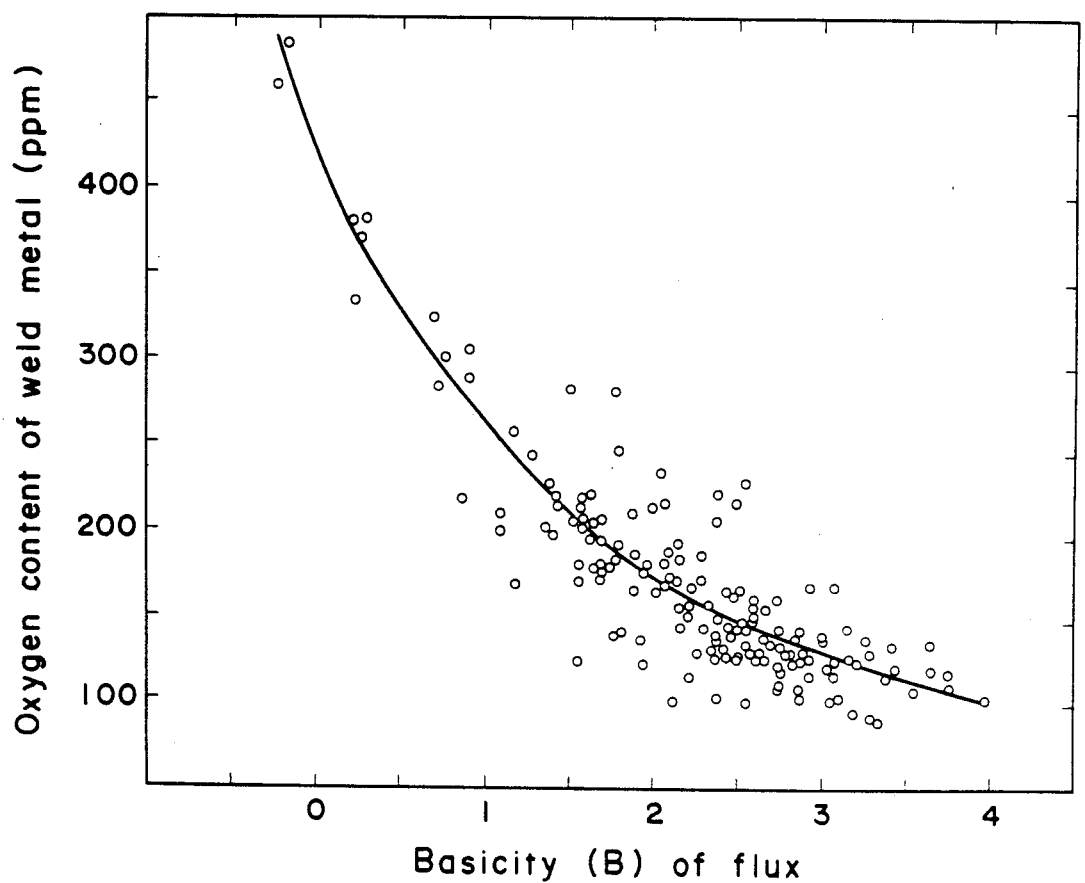
FIG. 2 is a diagram showing the relation between the basicity of flux and the oxygen content of the weld metal.

FIG. 2 shows the relation between the basicity of the fused type fluxes of various compositions and the oxygen content of the weld metals as determined in the submerged arc welding of steel plate by the use of the fluxes. The basicity involved in the data is that of B which is calculated in accordance with the formula (I) (wherever the term "basicity B" is used in this specification, it signifies the value determined by this formula).

$$B = 6.5N_{BaO} + 6.05N_{CaO} + 4.8N_{MnO} + 4.0N_{MgO} + \\ 3.4N_{FeO} + 5.1N_{CaF_2} + 0.3N_{ZrO_2} - 0.2N_{Al_2O_3} - \\ 2.2N_{TiO_2} - 6.3N_{SiO_2} \quad (I)$$

wherein N denotes mol percent of the respective components.

The formula excludes $K_2O$ and other alkali metal oxides as negligible because they are generally included in extremely small proportions.

It also excludes the $CO_2$ component as irrelevant to the calculation.

It is noted from FIG. 2 that the oxygen content of the weld metal decreases in proportion as the basicity (B) of the flux increases, so that the oxygen content falls below 300 ppm when the basicity (B) rises past 1.0 and the oxygen content falls even below 200 ppm when the basicity (B) exceeds 2.0.

A measure was sought for the flux of such high basicity to give weld beads of good form and prevent occurrence of various defects of welding. First, the importance of the control of the physical properties of fused flux such as the softening and fusing temperature and the viscosity was demonstrated. This invention is aimed at the system of CaO, MgO, $SiO_2$, and $Al_2O_3$. With the fused type flux of this particular system, the viscosity increases and the softening and fusing temperatures rise in the composition range having a high CaO content and the composition range having a low CaO content and a high $Al_2O_3$ content. In these composition ranges, the weld bead occurs in instable form. Particularly in the latter composition range, protuberances resembling a horse's back occur along the center of the weld beads surface. In these composition ranges, pockmarks are formed. A possible reason for the pockmarks is that when the fused flux has high viscosity, the CO gas generated by the reaction of $C+O \rightarrow CO$ fails to force its way through the layer of fused flux and accumulates in the flux-weld metal boundary. Although the softening and fusing temperature and the viscosity of the flux are not appreciably affected by the change in the MgO content, the stability of the form of the weld bead is impaired and the phenomenon of undercut occurs in the composition range having a high MgO content. The amount of slag inclusion increases with the increasing MgO content. The variation in the depth of penetration widens in proportion as the MgO content of the flux increases. It has been ascertained that the amount of slag inclusion varies in accordance with the variation in the depth of penetration and specifically that of slag inclusion increases in proportion as the variation in the depth of penetration widens.

MgO is inferred to jeopardize the stability of arc and consequently affect the reinforcement of the weld, the shape of penetration, the inclusion of slag, and the occurrence of undercut.

It has been demonstrated that increase of the $SiO_2$ content of the flux and addition of $CaF_2$ to the flux are effective in preventing slag inclusion and that the variation in the depth of penetration is narrowed by increasing such components.

$SiO_2$ and $CaF_2$ are components beneficial for the adjustment of the properties of fused flux. When the $SiO_2$ content increases, however, the oxygen content of the weld metal increases. When the $CaF_2$ content increases too much, the resultant gasification of $CaF_2$ possibly reaches the point of inducing formation of pockmarks and herringbones on the surface of the weld bead. The slag remaining after the welding process, on analysis, is found to have lower $CaF_2$, $SiO_2$, and $Al_2O_3$ contents and a higher CaO content than the flux. A possible reason for the change is that the following reactions proceed with gasification besides the volatilization of $CaF_2$ itself.

$$2CaF_2 + SiO_2 \rightarrow 2CaO + SiF_4 \uparrow$$

$$3CaF_2 + Al_2O_3 \rightarrow 3CaO + 2AlF_3 \uparrow$$

The phenomenon of pitting occurs in the composition range having a high CaO content. A logical explanation of this phenomenon calls for a postulate that the diffusible hydrogen content of the weld metal increases because the basicity of the flux is increased and consequently the water content of the flux is increased by an increase in CaO by the mechanism to be described afterward.

With the high-basicity flux which materializes the low-oxygen content of the weld metal as described above, the combination of components of the flux must be controlled synthetically in consideration of the effects which the individual components exert upon the physical properties of the molten flux, the condition of the arc, the generation of gaseous components, etc.

Figure 3:
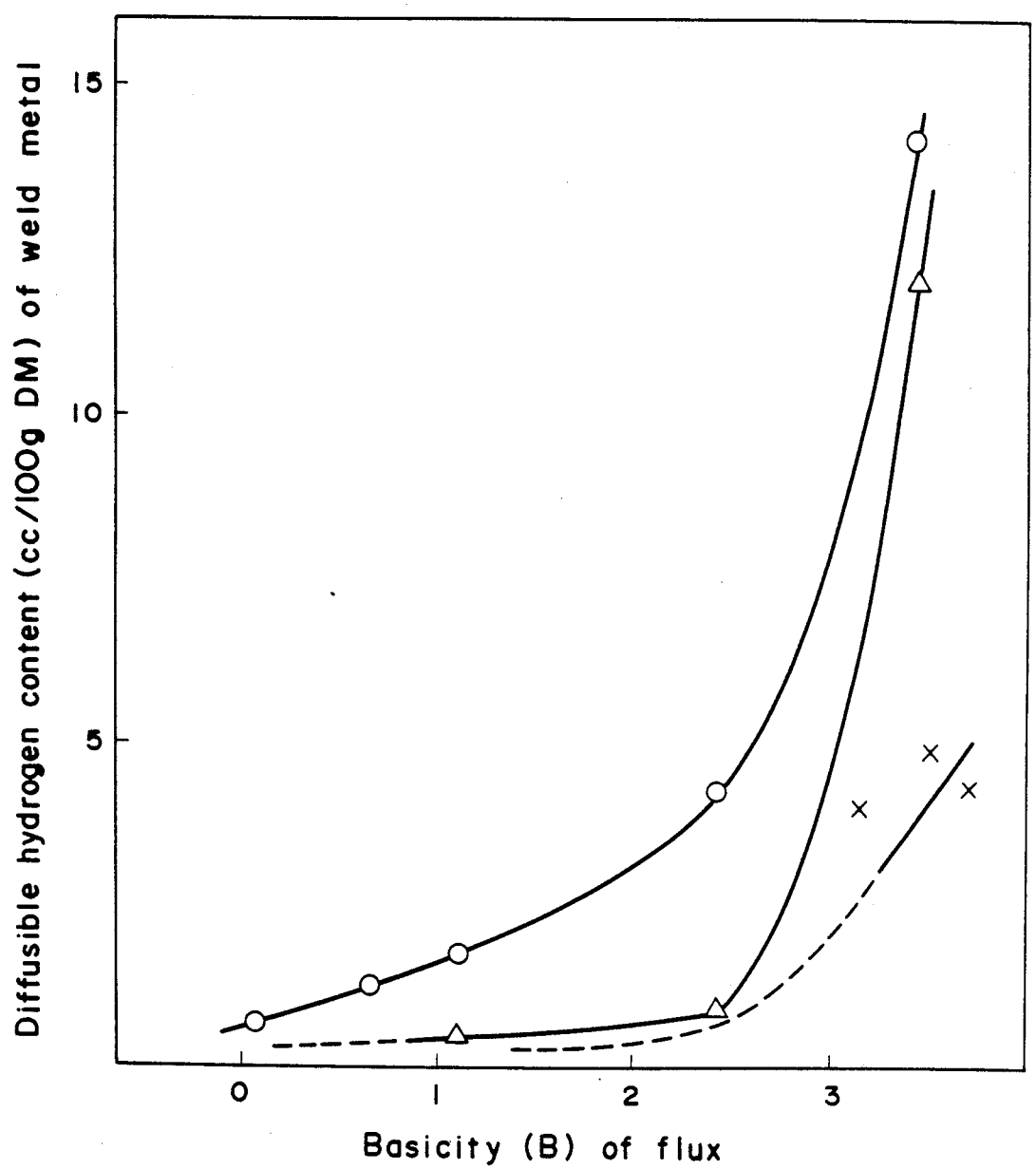
FIG. 3 is a diagram showing the relation between the basicity and the diffusible hydrogen content of the weld metal.

Now, the problem of the diffusible hydrogen encountered by the high-basicity flux will be described. FIG. 3 represents the relation between the basicity of flux and the diffusible hydrogen content in the weld metal as determined in the welding by use of flux of varying degrees of basicity.

The diffusible hydrogen content was determined in accordance with the method of JIS No. Z3116. The values of diffusible hydrogen content given in this specification are invariably those determined by this method.

In the diagram, the curve of circles O represents the data obtained for the fused type flux produced by fusing the raw materials for the flux in an electric furnace and, during the subsequent discharge of the fused blend from the furnace, cooling the blend with a jet of water. The curves of triangles $\Delta$ and crosses X represent the data obtained for the fused fluxes produced by fusing the raw materials in an electric furnace, dumping the fused blend from the furnace onto an iron plate, and allowing it to cool in the atmosphere. The flux of the triangles $\Delta$ contained not more than 10% of $CaF_2$ and that of the crosses X contained not less than 25% of $CaF_2$. It is noted from this diagram that in the flux which has undergone a water-cooling treatment, the diffusible hydrogen content gradually increases in proportion as the basicity (B) increases. For the diffusible hydrogen content to be kept below 6 cc/100 g DM, therefore, the basicity (B) of the flux must be held down below 2.7.

In the flux having a low $CaF_2$ content and having undergone an air-cooling treatment, the diffusible hydrogen content is small when the basicity (B) is less than 2.5 but the diffusible hydrogen content begins to increase abruptly when the basicity (B) exceeds 2.5. For the hydrogen content to be kept below 6 cc/100 g DM, therefore, the basicity (B) of the flux must be held down below 3.0.

The water contained in the flux which has undergone a water-cooling treatment originates in the moisture in the ambient air absorbed during the fusing of raw materials in the electric furnace and in the jet of water directly absorbed by the fused blend. It is considered that the total amount of water thus contained varies with the capacity of the molten flux for water absorption.

It has been found that in the flux which has undergone an air-cooling treatment, the hydrating mineral which crystallizes in the high-basicity composition range constitutes the main cause for the abrupt increase of hydrogen content beyond the basicity of 2.5. Although the kind of this hydrating mineral varies with the system of components present in the flux, it is identified to be $12CaO.7Al_2O_3$ (hereinafter referred to as $C_{12}A_7$ for short) in the system of components contemplated by this invention. The prevention of the formation of this hydrating mineral, therefore, forms a measure to decrease the diffusible hydrogen content of the weld metal in the welding with the flux of air-cooled treatment satisfying $B > 2.5$.

For preventing the crystallization of $C_{12}A_7$, the inventors have found two measures. One of them resides in increasing the $CaF_2$ content of the flux as suggested by the curve of crosses X (FIG. 3). The $C_{12}A_7$ content decreases in proportion as the $CaF_2$ content increases. It has been demonstrated that as the $CaF_2$ content increases, $3CaO.2SiO_2.CaF_2$ (cuspidine) and $3CaO.3Al_2O_3.CaF_2$ form and grow so much as to impede the formation of $C_{12}A_7$. The other measure resides in subjecting the flux which has been reduced to a fused state in the electric furnace and is now in the process of being discharged from the furnace to quick air cooling.

Figure 4:
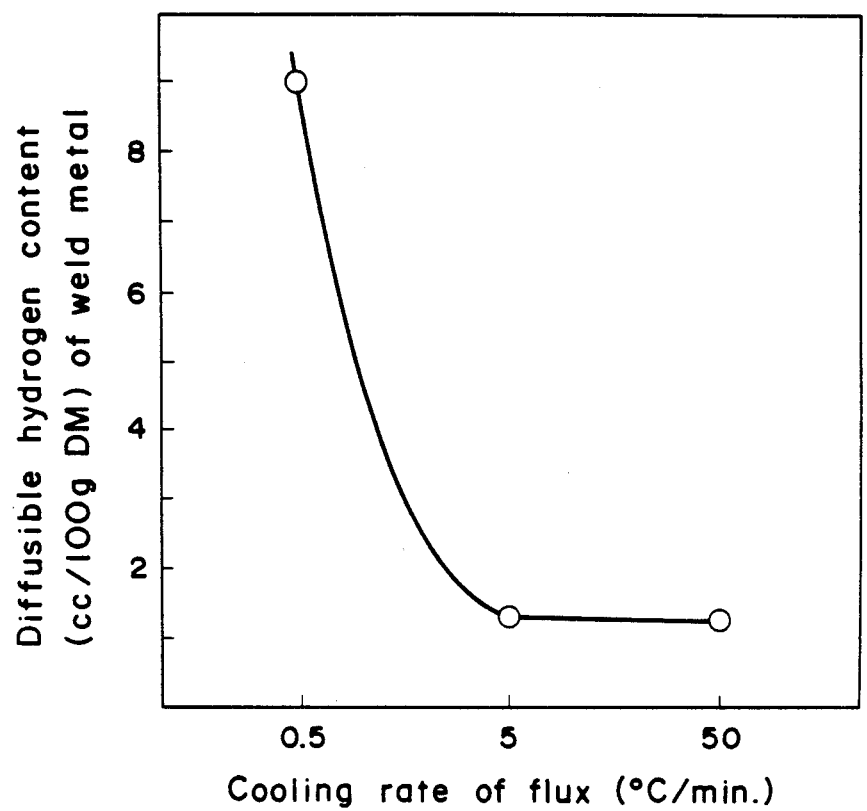
FIG. 4 is a diagram showing the relation between the cooling rate during the production of the flux and the diffusible hydrogen content.

Fused flux was dumped from the electric furnace onto an iron plate provided with a fence and spread thereon in a layer of varying thickness, 8 mm, 16 mm, and 55 mm. The layer of fused flux was tested for cooling rate at the middle point in the direction of layer thickness. The average cooling speed from 1650° C. to 1000° C. was 50° C./min, 5° C./min, and 0.5° C./min respectively. The flux samples thus obtained by the varying air-cooling treatments were tested for diffusible hydrogen content. The results are shown in FIG. 4. It is noted from this diagram that the diffusible hydrogen content decreases in proportion as the cooling rate increases and that the content becomes extremely small when the cooling speed exceeds 5° C./min. It has been ascertained by X-ray diffraction that in these cooling rates, the $C_{12}A_7$ content of the flux is extremely small.

For inhibiting the formation of $C_{12}A_7$ by increasing the $CaF_2$ content, the $CaF_2$ content in the flux must be at least 25%. For inhibiting the formation of $C_{12}A_7$ by increasing the cooling rate, the average cooling rate from 1650° C. to 1000° C. must be at least about 5° C./min. This requirement is accomplished by having the discharged fused flux spread in a layer thickness of not more than about 20 mm and left cooling in the atmosphere or by cooling the fused flux with a jet of air during the discharge thereof from the furnace.

The fact that the flux has been treated by the method just mentioned is expressed by the statement "which has undergone a quick air-cooling treatment" in the present specification and claims so as to be distinguished from the air-cooling treatment which has nothing to do with the rate of cooling and, therefore, is expressed by the statement "which has undergone an air-cooling treatment."

The fact that the fused flux discharged from the electric furnace is cooled by the jet of water or otherwise cooled with water as by being thrown into a body of water is expressed by the statement "which has undergone a water-cooling treatment."

Figure 5:
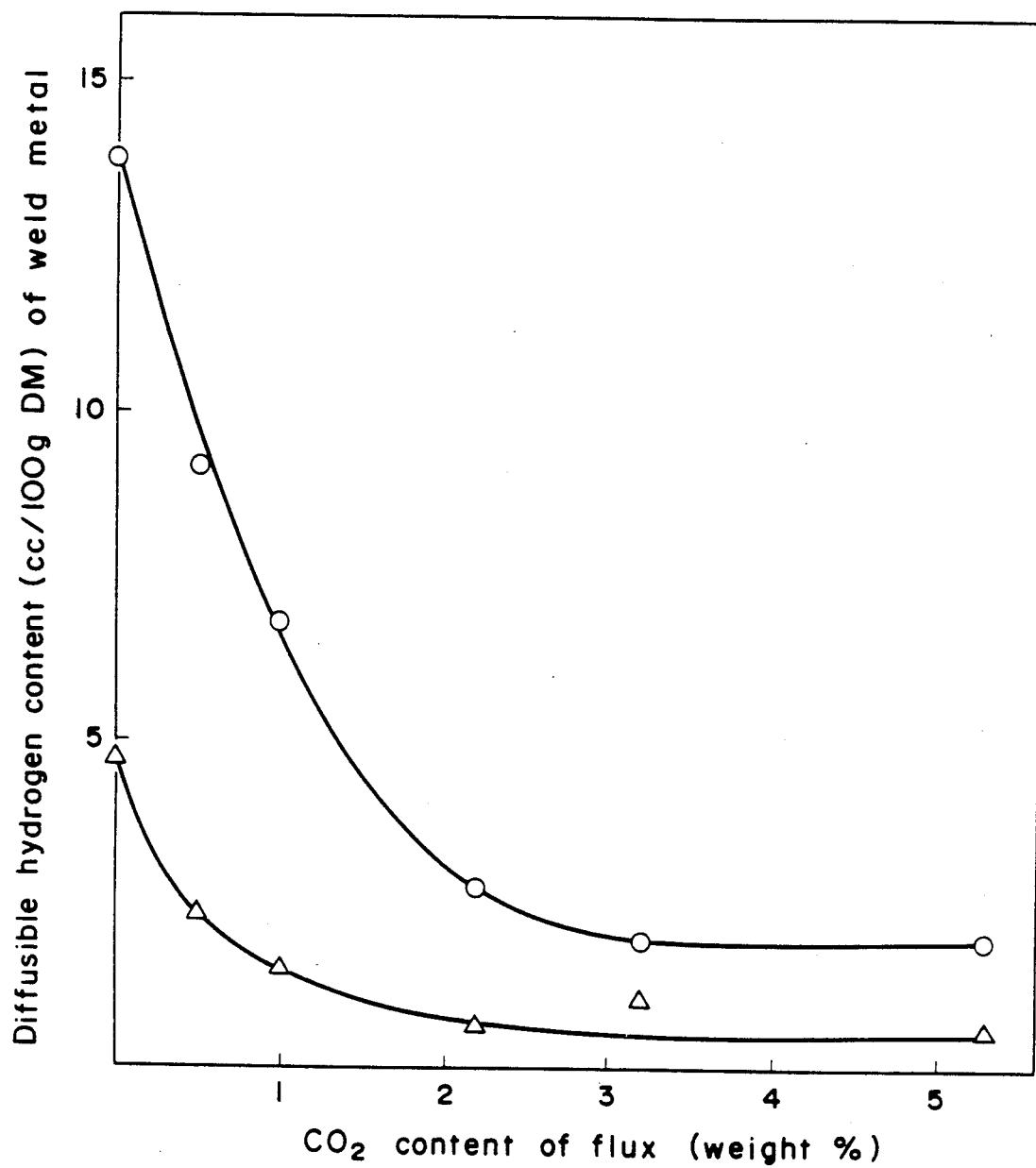
FIG. 5 is a diagram showing the relation between the $CO_2$ content of the flux and the diffusible hydrogen content.

The diffusible hydrogen content in the weld metal can be decreased by another method. FIG. 5 represents the results of a test conducted by adding a varying amount of limestone ($CaCO_3$: calcite by the mineral terminology) to fused type fluxes of two different kinds thereby lowering the partial pressure of hydrogen in the arc cavity owing to the $CO_2$ gas liberated by the decomposition of limestone during the welding. It is noted from the diagram that the diffusible hydrogen content decreases in proportion as the amount of $CO_2$ (limestone) added to the flux increases but that this effect is saturated when the amount of $CO_2$ exceeds 3%. More effective decrease of the hydrogen content is attained by combining this method with the aforementioned method for the manufacture of flux.

Now, the results of the study conducted in search of a method for lowering the nitrogen content of the weld metal will be described. Various theories have been advanced as described above to explain the mechanism of the reciprocal changes in the oxygen content and the nitrogen content of the weld metal produced by fluxes of various components. None of them has found general acceptance. The inventors have found two methods for enabling the shielding action of the gaseous component to lower the nitrogen content while lowering, or at least not entailing any increase of, the oxygen content of the weld metal.

Figure 6:
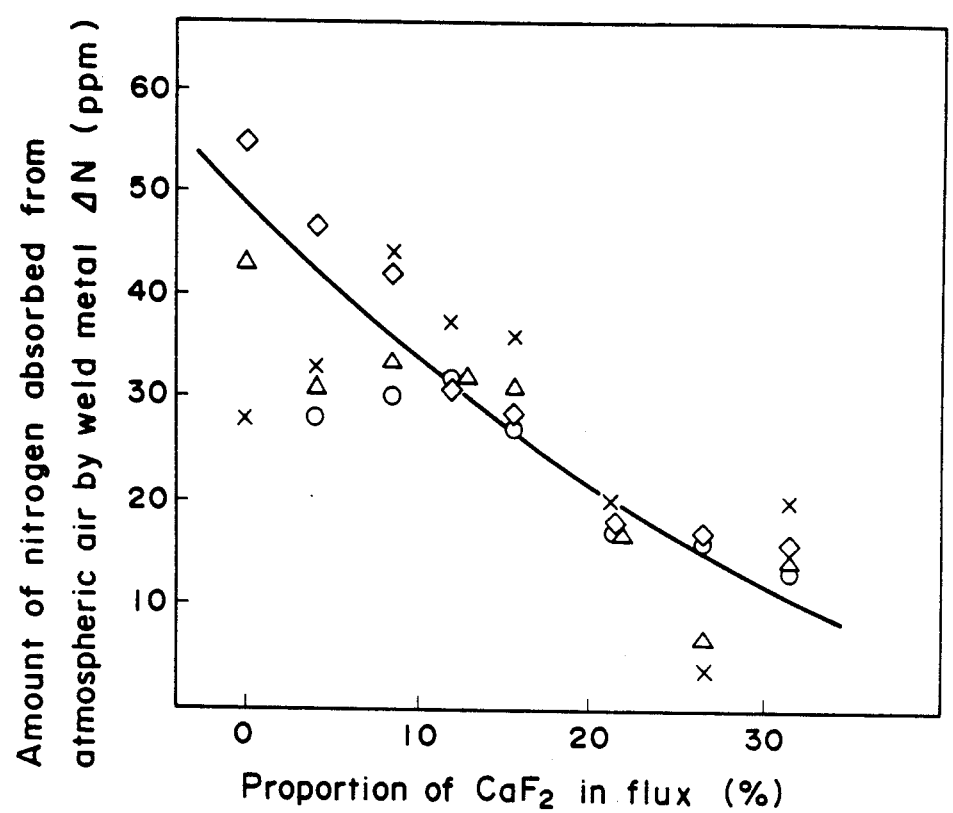
FIG. 6 is a diagram showing the relation between the $CaF_2$ content of the flux and the amount of nitrogen the weld metal absorbs from the ambient air.

FIG. 6 represents the data obtained by preparing four kinds of fluxes each of varying $CaF_2$ contents and analyzing the weld metals obtained by use of the fluxes for nitrogen content. The nitrogen contents indicated herein are the values of $\Delta N$ calculated in accordance with the following formula.

$$\Delta N = N - \frac{N_1 w_1 + N_2 w_2}{w_1 + w_2}$$

wherein

N denotes the nitrogen content of the weld metal found by the analysis (ppm), $N_1$ denotes the nitrogen content of the base metal (ppm), $N_2$ denotes the nitrogen content of the wire (ppm), $w_1$ denotes the amount of the base metal melted during the welding, and $w_2$ denotes the amount of the wire melted during the welding.

The nitrogen content, N, of the weld metal is affected by the nitrogen content of the base metal and that of the wire, whereas the nitrogen content $\Delta N$ may well be regarded as representing the change in the nitrogen content due to the action of the flux while eliminating such effects described above.

It is noted from the diagram that the nitrogen content, $\Delta N$, decreases in proportion as the $CaF_2$ content of the flux increases and specifically that this content does not exceed 20 ppm when the $CaF_2$ content is larger than 20%. This effect, as already described, is ascribable to the fact that the gases produced when the $CaF_2$ is gasified by the heat of the arc in the form of $CaF_2 \uparrow$, $SiF_4 \uparrow$, and $AlF_3 \uparrow$ bring about the shielding effect to preclude otherwise possible absorption of nitrogen from the ambient air. These gases have no possibility of increasing the oxygen content of the weld metal. In fact, the oxygen content of the weld metal decreases in proportion as the $CaF_2$ content increased.

Figure 7:
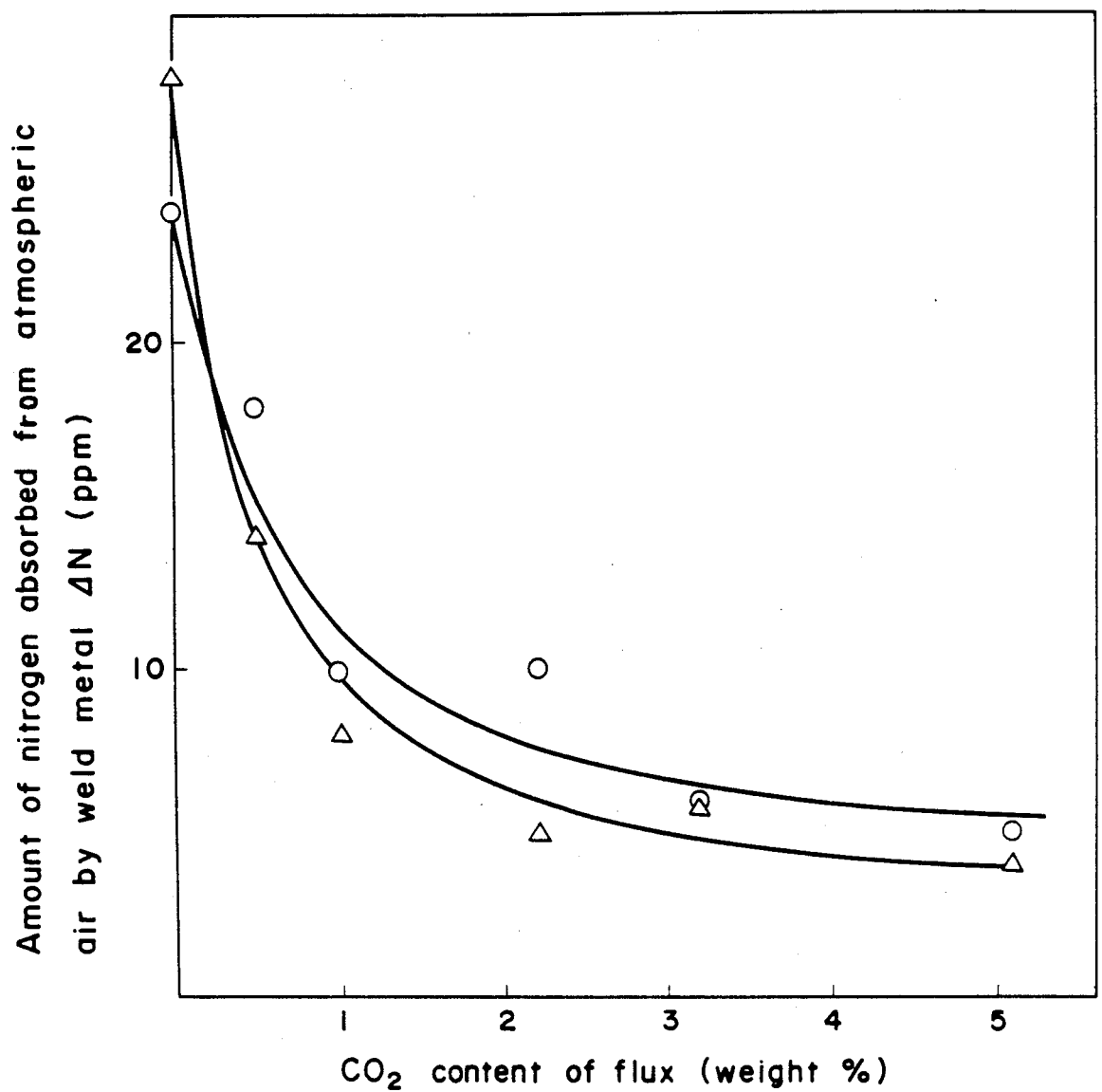
FIG. 7 is a diagram showing the relation between the $CO_2$ content of the flux and the amount of nitrogen the weld metal absorbs from the ambient air.
Figure 8:
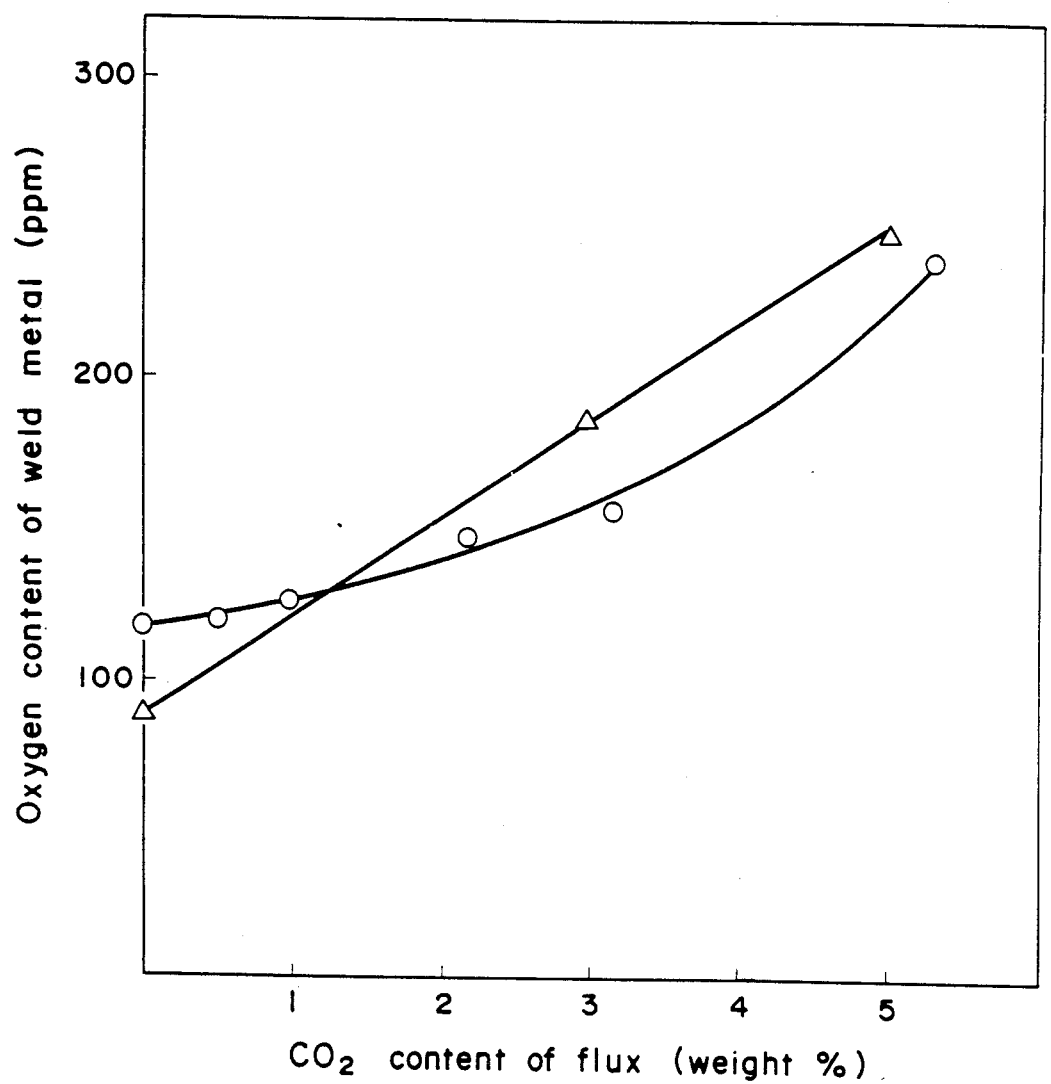
FIG. 8 is a diagram showing the relation between the $CO_2$ content of the flux and the oxygen content of the weld metal.

FIG. 7 represents the results of a test conducted by preparing fluxes of two different kinds each containing varying amounts of $CO_2$, similarly to the test of FIG. 5, and determining the effect of the $CO_2$ content on the nitrogen content, $\Delta N$. In the diagram, the curve of circles O represents the data obtained for the flux containing particles finer than 250 mesh in an amount of not less than 20% and the curve of triangles $\Delta$ represents the data obtained for the flux containing particles finer than 250 mesh in an amount of not more than 20%. It is noted from this diagram that the nitrogen content, $\Delta N$, decreases in proportion as the $CO_2$ content increases. It is considered that this marginal effect gradually decreases and the effect of $CO_2$ is saturated when the $CO_2$ content exceeds 5%. Despite a fear that $CO_2$ would add to the oxygen content of the weld metal, the data of FIG. 8 indicate that while it is recognized to increase the oxygen content of weld using fluxes other than this invention (shown by the curve of triangles $\Delta$), the increase in the oxygen content is in a small ratio even when the $CO_2$ content is increased in the flux of the system contemplated by this invention (shown by the curve of circles O).

By using these methods either severally or in suitable combinations, the nitrogen content of the weld metal can be decreased without entailing any addition, or at least any noticeable addition, to the oxygen content.

SUMMARY OF THE INVENTION

This invention has been perfected on the basis of the various knowledges described above and may be summarized as follows.

(1) A flux for use in the submerged arc welding, which simultaneously satisfies the requirements (1), (2)-(c), (3), and (5)-(b) defined below.

(2) A flux for use in the submerged arc welding, which simultaneously satisfies the following requirements (1), (2)-(a), (2)-(c), (3), (4), and (5)-(a).

(3) A flux for use in the submerged arc welding, which simultaneously satisfies the following requirements (1), (2)-(c), (3), (4), and (5)-(c).

(4) A flux for use in the submerged arc welding, which simultaneously satisfies the following requirement (1), (2)-(a), (3), (4), (5)-(a), and (6).

(5) A flux for use in the submerged arc welding, which simultaneously satisfies the following requirements (1), (2)-(b), (3), (4), (5)-(c), and (6).

(6) A flux for use in the submerged arc welding, which simultaneously satisfies the following requirements (1), (2)-(c), (3), and (5)-(d).

(7) A flux for use in the submerged arc welding, which simultaneously satisfies the following requirements (1), (2)-(b), (3), (4), (5)-(d), and (6).

(8) A flux for use in the submerged arc welding, which simultaneously satisfies the following requirements (1), (2)-(c), (3), (4), (5)-(b), and (6).

(9) A flux for use in the submerged arc welding, which simultaneously satisfies the following requirements (1), (2)-(c), (3), (4), (5)-(d), and (6).

(10) A flux for use in the submerged arc welding, which simultaneously satisfies the following requirements (1), (2)-(c), (3), (4), (5)-(b), (5)-(d), and (6).

Requirement (1): The flux has a four-component system of CaO, MgO, $Al_2O_3$, and $SiO_2$ such that the proportions of the four components to the total amount thereof taken as unity (100%) fall in the following respective ranges:
CaO: 10 to 60%
MgO: Not more than 30%
$Al_2O_3$: 20 to 70%
$SiO_2$: 5 to 40%
and that the total amount of the four components accounts for not less than 35% of the total weight of the flux less the $CO_2$ component thereof.

Requirement (2): The flux contains $CaF_2$ in the amount indicated below, based on the total weight of the flux except for the $CO_2$ component thereof.

-(a) 15 to 60%
-(b) 15 to 65%
-(c) 25 to 65%

Requirement (3): The basicity (B) of the flux calculated in accordance with the following formula (I) is not less than 1.0

$$B = 6.50N_{BaO} + 6.05N_{CaO} + 4.8N_{MnO} + 4.0N_{MgO} + \quad (I)$$
$$3.4N_{FeO} + 5.1N_{CaF_2} + 0.3N_{ZrO_2} - 0.2N_{Al_2O_3} -$$
$$2.2N_{TiO_2} - 6.3N_{SiO_2}$$

wherein N denotes the mol percentage of the respective components.

Requirement (4): The flux contains both a fused substance and a non-fused substance.

Requirement (5)-(a): The fused substance has undergone a water-cooling treatment and the basicity (B) of the fused substance calculated in accordance with the above formula (I) is not more than 2.7.

Requirement (5)-(b): The fused substance has undergone an air-cooling treatment and it contains not less than 25% of $CaF_2$.

Requirement (5)-(c): The fused substance has undergone an air-cooling treatment and the basicity (B) of the fused substance calculated in accordance with the above formula (I) is not more than 3.0.

Requirement (5)-(d): The fused substance has undergone a quick air-cooling treatment.

Requirement (6): The non-fused substance contains a carbonate mineral in an amount such that the $CO_2$ constituting the carbonate mineral, as reduced to $CO_2$ gas, accounts for a proportion of from 0.2 to 5.0% of the total weight of the flux less the $CO_2$ component thereof.

Now, this invention will be described in detail below.

DETAILED DESCRIPTION OF THE INVENTION

First, the present invention has issued from the study conducted basically on the fused type flux of a system of CaO, MgO, $SiO_2$, and $Al_2O_3$.

For the flux used for welding to acquire an addition to its basicity, it is required to contain therein basic oxides such as CaO, BaO, and MgO in large amounts. As the raw materials for these oxides, there are generally used limestone ($CaCO_3$) and wollatonite ($CaSiO_3$) for CaO, barium carbonate ($BaCO_3$) for BaO, and magnesia clinker (MgO) and olivine sand ($Mg_2SiO_4$) for MgO, for example. By using such raw materials as $CaSiO_3$ and $Mg_2SiO_4$ which contain $SiO_2$, the basicity of the flux cannot be increased as much as is desired. When such carbonates as $CaCO_3$ and $BaCO_3$ are incorporated in large amounts and the $CO_2$ content of the flux is excessively increased, there ensue troubles such as the formation of pockmarks as described afterward. Thus, in the bonded type flux which allows minerals used as raw materials for the flux to remain in their original form in the produced flux, namely the flux which is produced by combining such raw materials with a binder such as water glass, pelletizing the resultant mixture in a suitable size, and firing the produced pellets at temperatures in the neighborhood of 500° C., there is very little freedom in the design of the composition. Thus, the flux satisfies the requirement on the form of weld bead and the requirement on the control of chemical composition of weld metal only with difficulty. This invention which is aimed at the fused type flux, therefore, relies on the following methods for the fulfilment of various requirements such as the limitation of the basicity of the flux which has undergone a water-cooling treatment (FIG. 3 dictates the condition $B<2.7$ for the hydrogen content to be kept below 6 cc/100 g DM) and the inclusion of $CO_2$ in the flux.

The raw materials to be used are divided into two groups. The raw materials in one group are those which are fused as in an electric furnace, cooled, and then pulverized to a suitable size before use. (These raw materials are collectively referred to as "fused substance" in the specification.) The raw materials in the other group are those which are put to use in their unaltered form. (These raw materials are collectively referred to as "non-fused substance" in the specification.) The raw materials of the two groups are mixed to produce the flux for use in the welding. When a fused substance is prepared to acquire basicity of not more than 2.7 and a non-fused substance to acquire basicity of not less than 2.7 and the two substances are mixed to produce a flux for the welding, then the diffusible hydrogen content can be kept from exceeding 6 cc/100 g DM even if the fused substance has undergone a water-cooling treatment. Further, by allowing the basicity of the non-fused substance to exceed 2.7, the basicity of the flux exceeding 2.7 and the low oxygen content of the weld metal are both satisfied. Moreover, the inclusion of a carbonate source in the non-fused substance permits free change of the $CO_2$ content of the flux and, consequently, enables the hydrogen content and the nitrogen content to be controlled as indicated in FIG. 5 and FIG. 7.

The allowable nitrogen content of the weld metal is determined by the purpose for which the weld assembly is used and the kinds of the other alloying elements of the weld metal. Besides, the nitrogen content of the weld metal is conspicuously affected by the nitrogen content of the base metal subjected to welding and that of the welding wire. Unless these conditions are fixed, the appropriate nitrogen content, $\Delta N$, which the flux for the welding is must to acquire, cannot be decided. As the level of the nitrogen content below which the flux generally finds utility in a wider range of applications, the present invention is constructed on the principle of realizing $\Delta N<20$ ppm, and more desirably $\Delta N<10$ ppm. Similarly, the allowable diffusible hydrogen content is determined by the welding procedure, the purpose for which the weld assembly is used, the strength of the base metal subjected to welding, etc. In this respect, this invention is constructed on the principle of preventing the hydrogen content from exceeding 6 cc/100 g DM, more desirably 3 cc/100 g DM, and most desirably 1 cc/100 g DM.

Besides the conditions mentioned above, the present invention is constructed on the principle of preventing the oxygen content of the weld metal from exceeding 300 ppm and producing a weld bead of good form without entailing weld defects.

Now, the reason for the adoption of each of the foregoing requirements will be described below. On Requirement (1):

To ensure decrease of the oxygen content of the weld metal, the basicity of the flux must be maintained at a high level. For this purpose, this invention contemplates limiting the amount of $SiO_2$, a particular substance which is beneficial for the adjustment of the physical properties of flux but possesses high acidity, using $Al_2O_3$, a substance exhibiting an intermediate between neutrality and acidity, as a main acidic component necessary for the adjustment of physical properties, and further incorporating CaO and MgO as typical basic components. Thus, this invention has its flux based on the system of CaO, MgO, $Al_2O_3$, and $SiO_2$.

CaO is a basic oxide to be used for maintaining the basicity of the flux at a high level. If the proportion of the CaO content to the total amount of the aforementioned four components taken as unity (100%) exceeds 60%, the viscosity of the fused flux excessively increases to jeopardize the stable shape of the reinforcement of weld bead and induce formation of pockmarks and pits. If the CaO content is less than 10%, the viscosity increases and the softening and fusing temperature rises so much that the removal of the entrapped gas through the slag is attained only with difficulty and the formation of pockmarks ensues. Further, owing to the actions of the MgO and $Al_2O_3$ contents increased to make up for the loss of the CaO content which form a contributory factor, the weld bead is caused to sustain protuberances resembling horse's back along the central part thereof and undercut occurs.

In the composition range having $Al_2O_3$ content of more than 70%, there occurs the same problem of poor weld bead shape and weld defects as encountered in the composition range having a CaO content of less than 10%. In the composition range having an $Al_2O_3$ content of less than 20%, there ensues the same problem encountered in the composition range having a CaO content of more than 60%.

MgO is also an oxide to be used for maintaining the basicity of the flux at a high level. If the proportion of the MgO content exceeds 30%, the shape of penetration is unstable and the slag inclusion increases. In this condition, the slag inclusion can no longer be prevented by the additional incorporation of $CaF_2$ as described afterward. If the proportion of the MgO content exceeds 30%, the shape of weld bead-reinforcement is unstable and undercut occurs.

$SiO_2$ is a substance beneficial for the adjustment of physical properties of the flux and the production of weld beads of good form. If the proportion of the $SiO_2$ content exceeds 40%, it becomes difficult to keep the oxygen content of the weld metal below the mark of 300 ppm which is described more fully afterward. If the proportion of the $SiO_2$ content is less than 5%, the form of weld bead is rather unstable and the oxygen content of the weld metal increases slightly despite an increase of basicity. Thus, the proportions of the CaO, MgO, $Al_2O_3$, and $SiO_2$ contents must be made to fall in the ranges described above. And the total amount of these four components must be at least 35% of the weight of the flux. If the total amount is less than 35%, the effect peculiar to the system in question cannot be fully manifested and the production of weld bead of good form cannot be obtained. On Requirement (2):

$CaF_2$ fulfils various functions in the flux of the present invention. First, $CaF_2$ is a basic fluoride which is effective in rendering the flux highly basic. Since $CaF_2$ is capable of lowering the viscosity and the softening and fusing temperatures of the flux, incorporation of this component in a suitable proportion proves advantageous for the production of weld bead of good form. Further, $CaF_2$ has a conspicuous effect of stabilizing the form of penetration and preventing the slag inclusion. To fulfil all these objects, particularly to prevent the slag inclusion, it suffices to use $CaF_2$ in a proportion of at least 6% of the total weight of the flux.

However, $CaF_2$ in this proportion is not sufficient for the purpose of decreasing both the amount of nitrogen absorbed by the weld metal and the diffusible hydrogen content of the weld metal as described below.

Requirement (2)-(a) fixes the lower limit of the $CaF_2$ content at 15% for the purpose of preventing, through cooperation with Requirement (6), the nitrogen content, $\Delta N$, from exceeding 20 ppm. This requirement has been set on the premise that it will cooperate with Requirement (5)-(a). In the flux using a fused substance which has undergone a water-cooling treatment, the produced weld bead sustains pockmarks if the $CaF_2$ content exceeds 60%.

Requirement (2)-(b), similarly to Requirement (2)-(a), fixes the lower limit of the $CaF_2$ content at 15% for the purpose of preventing the nitrogen content, $\Delta N$, from exceeding 20 ppm, through cooperation with Requirement (6). If the $CaF_2$ content exceeds 65%, the characteristics of this invention described in Requirement (1) are lost.

Requirement (2)-(c) fixes the lower limit of the $CaF_2$ content at 25% for the purpose of preventing the nitrogen content from exceeding 20 ppm as shown in FIG. 6. In actuality, the nitrogen content may be lowered below the range of 15 to 20 ppm. The upper limit of the $CaF_2$ content is fixed at 65% for the same reason as in Requirement (2)-(b). On Requirement (3):

The lower limit of the basicity of the flux is fixed at 1.0 for the purpose of preventing the oxygen content of the weld metal from exceeding 300 ppm as shown in FIG. 2. On Requirement (4):

The idea of dividing the raw materials for flux into two groups, treating the raw materials of one group collectively as a fused substance and those of the other group collectively as a non-fused substance, and mixing the fused substance and the non-fused substance to produce the flux for welding, as described above, constitutes an effective approach to making the most of the strong points of the fused type flux and the bonded type flux and making up for any weak point in either flux.

The fused substance can have its particle size freely adjusted to a desired level by regulating the method of pulverization which is performed subsequently to the steps of melting and cooling. The non-fused substance, on the other hand, has the possibility of containing therein excessively fine particles among the component raw materials. The presence of such extremely fine particles is suspected to entail the phenomenon of segregation. In this case, the mixture of the fused substance and the non-fused substance may be mixed with a small amount of water glass or sodium aluminate as a binder and pelletized to produce a bonded type flux.

Generally, the raw materials for flux contain water, though in very small amounts. The water chiefly originates in the water occurring as a liquid inclusion and the water of crystallization contained in trace minerals inevitably entrained by the raw materials. Generally, both the fused substance and the non-fused substance have small amounts of water adhering thereto. Further, the bonded type flux has water brought in by the water glass. To be freed from water of these varying origins, the flux of this invention must be dried or fired at temperatures generally in the range of 300° to 600° C. for about two hours as in the production of the ordinary bonded type flux. If this treatment is performed at temperatures exceeding 600° C., the carbonate mineral is decomposed to produce hydrating minerals such as CaO. If, in this case, the fused substance contains not less than 25% of $CaF_2$, the $CaF_2$ component is recrystallized to induce crystallization of such hydrating minerals as $C_{12}A_7$, with the possible result that the water content of the flux will be increased. Depending on the formulation of the flux, therefore, the temperature of this treatment must be fixed with due attention paid to such peculiar behavior of heat. On Requirement (5):

Requirement (5)-(a) specifies the fused substance to be of a type which has undergone a water-cooling treatment and to possess basicity (B) of not more than 2.7. As is plain from FIG. 3, this limitation is for the purpose of preventing the diffusible hydrogen content from exceeding 6 cc/100 g DM.

Requirement (5)-(b) specifies the fused substance to be of a type which has undergone an air-cooling treatment and to contain at least 25% of $CaF_2$ for the purpose of discouraging crystallization of $C_{12}A_7$ and keeping the hydrogen content below 6 cc/100 g DM, actually even below 4 to 5 cc/100 g DM by incorporation of not less than 25% of $CaF_2$ as shown in FIG. 3 (the curve of crosses X).

Requirement (5)-(c) specifies the fused substance to be of a type which has undergone an air-cooling treatment and to possess basicity (B) of not more than 3.0 for the purpose of keeping the hydrogen content below 6 cc/100 g DM as is noted from FIG. 3.

Requirement (5)-(d) specifies the fused substance to be of a type which has undergone a quick air-cooling treatment because the quick air-cooling treatment enables the fused substance to minimize crystallization of $C_{12}A_7$ and keep the hydrogen content below 6 cc/100 g DM. In actuality, the hydrogen content can be lowered even below 3 cc/100 g DM to the neighborhood of slightly over 1 cc. On Requirement (6):

Requirement (6) specifies the non-fused substance to be of a type which contains a carbonate mineral in an amount such that the $CO_2$ constituting the carbonate mineral, as reduced to $CO_2$ gas, accounts for a proportion of from 0.2 to 5.0% of the total weight of the flux less the $CO_2$ component thereof for the purpose of enabling the non-fused substance to be decomposed with evolution of $CO_2$ by the heat of arc during the process of welding. This explains why the non-fused substance is required to contain the carbonate mineral. As shown in FIG. 5 and FIG. 7, the $CO_2$ gas results in decreasing the diffusible hydrogen content and the nitrogen content of the weld metal. As is noted from these diagrams, the carbonate mineral is effective so long as it is contained even in a very small amount. As the amount capable of bringing about practically the expected effect of affecting the hydrogen content above 1.5 cc/100 g DM and the nitrogen content, $\Delta N$, about 5 ppm, the lower limit of the $CO_2$ component has been fixed at 0.2%. The reason for the upper limit 5% to the $CO_2$ component is that any excess of the $CO_2$ component over this limit is not expected to bring about any additional improvement regarding the control of the hydrogen content and the nitrogen content, $\Delta N$. If the $CO_2$ content exceeds this upper limit, the weld bead sustains marks of gas escape such as pockmarks and herringbone marks. This excess $CO_2$ content is also suspected of increasing the oxygen content of the weld metal beyond the level of 300 ppm.

By suitably combining these requirements, low-oxygen fluxes containing nitrogen and diffusible hydrogen in varying proportions and producing weld beads of good form can be produced.

For the purpose of producing weld beads of good form, it suffices to satisfy Requirements (1) and (2) at the same time.

To prevent the oxygen content of the weld metal for exceeding 300 ppm, the flux is required to fulfil Requirement (3).

To prevent the nitrogen content, $\Delta N$, from exceeding 20 ppm, either a combination of Requirement (2)-(a) or Requirement (2)-(b) with Requirement (6) (naturally in conjunction with Requirement (4); this implication similarly applied hereinafter) or fulfilment of Requirement (2)-(c) suffices. The nitrogen content, $\Delta N$, can be lowered even to or below about 10 ppm by combining Requirement (2)-(c) with Requirement (6).

By any of Requirements (5)-(a), -(b), -(c), and -(d), the hydrogen content can be lowered to or below 6 cc/100 g DM. Especially by Requirement (5)-(b), it can be lowered to or below 4 to 5 cc/100 g DM. And by Requirement (5)-(d), it can be further lowered to or below 3 cc/100 g DM. The combination of Requirement (5)-(b) with Requirement (6) permits the hydrogen content to be lowered to or below about 3 cc and that of Requirement (5)-(d) with Requirement (6) enables the hydrogen content to be lowered, without fail, to or below 3 cc. Also, the combination of Requirement (5)-(b) with Requirement (5)-(d) warrants safe decrease of the hydrogen content to or below 3 cc/100 g DM. When Requirement (5)-(b), Requirement (5)-(d), and Requirement (6) are satisfied all at once, the hydrogen content can be lowered to or below 1 cc/100 g DM.

This invention is aimed at producing welding fluxes capable of producing weld beads of good form free from weld defects and giving weld metal of low oxygen, nitrogen and diffusible hydrogen contents by proper combination of the requirements described above.

Now, the first through tenth aspects of the present invention satisfying these requirements in varying combinations will be described below.

The first, second, third, fourth, and fifth aspects of the invention concern welding flux compositions which realize the requirement that the oxygen content in the weld metal should be not more than 300 ppm, the value of $\Delta N$ not more than 20 ppm, and the diffusible hydrogen content not more than 6 cc/100 g DM, and permit formation of a satisfactory weld bead free from weld defects. On the first aspect:

The combination of Requirement (1) with Requirement (2)-(c) permits production of weld beads of perfect form. Requirement (3) serves to lower the oxygen content of weld metal to or below 300 ppm. Requirement (2)-(c) permits the nitrogen content, $\Delta N$, of weld metal to be lowered to or below 20 ppm. By Requirement (5)-(b), the diffusible hydrogen content of weld metal is lowered to or below 6 cc/100 g DM. On the second aspect:

The combination of Requirement (1) with Requirement (2)-(a) permits production of weld beads of perfect form. Requirement (3) enables the oxygen content of weld metal to be lowered to or below 300 ppm. By Requirement (2)-(c), the nitrogen content, $\Delta N$, of weld metal is lowered to or below 20 ppm. By the combination of Requirement (4) with Requirement (5)-(a), the diffusible hydrogen content of weld metal is lowered to or below 6 cc/100 g DM. In this case, the fact that Requirement (2)-(a) and Requirement (2)-(c) are satisfied at the same time means that the proportion of the $CaF_2$ content to the total weight of the flux less the $CO_2$ component will fail in the range of 25 to 60%. On the third aspect:

The combination of Requirement (1) with Requirement (2)-(c) permits production of weld beads of perfect form. Requirement (3) serves to lower the oxygen content of weld metal to or below 300 ppm. By Requirement (2)-(c), the nitrogen content, $\Delta N$, is lowered to or below 20 ppm. By the combination of Requirement (4) with Requirement (5)-(c), the diffusible hydrogen content of weld metal is lowered to or below 6 cc/100 g DM. On the fourth aspect:

The combination of Requirement (1) with Requirement (2)-(a) permits production of weld beads of perfect form. Requirement (3) permits the oxygen content of weld metal to be lowered to or below 300 ppm. By the combination of Requirement (2)-(a) with Requirement (4) and Requirement (6), the nitrogen content, $\Delta N$, of weld metal is lowered to or below 20 ppm. The combination of Requirement (4) with Requirement (5)-(a) and Requirement (6) warrants safe decrease of the diffusible hydrogen content of weld metal to or below 6 cc/100 g DM. On the fifth aspect:

The combination of Requirement (1) with Requirement (2)-(b) permits production of weld beads of perfect form. By Requirement (3), the oxygen content of weld metal is lowered to or below 300 ppm. The combination of Requirement (2)-(b) with Requirement (4) and Requirement (6) enables the nitrogen content, $\Delta N$, of weld metal to be lowered to or below 20 ppm. By the combination of Requirement (4) with Requirement (5)-(c) and Requirement (6), safe decrease of the diffusible hydrogen content of weld metal to or below 6 cc/100 g DM is realized.

The sixth and seventh aspects are directed to welding fluxes which realize the lowering of the oxygen content of weld metal to or below 300 ppm, the nitrogen content, $\Delta N$, of weld metal to or below 20 ppm, and the diffusible hydrogen content of weld metal to or below 3 cc/100 g DM all at once in the weld metal, and produce weld beads of good form free from weld defects. On the sixth aspect:

The combination of Requirement (1) with Requirement (2)-(c) permits production of weld beads in perfect form. Requirement (3) serves to lower the oxygen content of weld metal to or below 300 ppm. Requirement (2)-(c) permits the nitrogen content, $\Delta N$, of weld metal to be lowered to or below 20 ppm. By Requirement (5)-(d), the diffusible hydrogen content of weld metal is lowered to or below 3 cc. On the seventh aspect:

The combination of Requirement (1) with Requirement (2)-(b) permits production of weld beads in perfect form. Requirement (3) serves to lower the oxygen content of weld metal to or below 300 ppm. The combination of Requirement (2)-(b) with Requirement (4) and Requirement (6) permits the nitrogen content, $\Delta N$, of weld metal to be lowered to or below 20 ppm. By the combination of Requirement (4) with Requirement (5)-(d) and Requirement (6), the diffusible hydrogen content of weld metal is lowered to or below 3 cc.

The eighth and ninth aspects are directed to welding fluxes which realize the lowering of the oxygen content of weld metal to or below 300 ppm, the nitrogen content, $\Delta N$, of weld metal to or below about 10 ppm, and the diffusible hydrogen content of weld metal to or below 3 cc all at once in the weld metal, and produce weld beads of good form free from weld defects. On the eighth aspect:

The combination of Requirement (1) with Requirement (2)-(c) permits production of weld beads of perfect form. Requirement (3) serves to lower the oxygen content of weld metal to or below 300 ppm. The combination of Requirement (2)-(c) with Requirement (4) and Requirement (6) permits the nitrogen content of weld metal to be lowered to or below about 10 ppm. By the combination of Requirement (4) with Requirement (5)-(b) and Requirement (6), the diffusible hydrogen content is lowered to or below about 3 cc. On the ninth aspect:

The combination of Requirement (1) with Requirement (2)-(c) permits production of weld beads of perfect form. Requirement (3) serves to lower the oxygen content of weld metal to or below 300 ppm. The combination of Requirement (2)-(c) with Requirement (4) and Requirement (6) permits the nitrogen content of weld metal to be lowered to or below about 10 ppm. By the combination of Requirement (4) with Requirement (5)-(d) and Requirement (6), the diffusible hydrogen content of weld metal is lowered to or below 3 cc.

The tenth aspect is directed to a welding flux which realizes the lowering of the oxygen content of weld metal to or below 300 ppm, the nitrogen content, $\Delta N$, of weld metal to or below about 10 ppm, and the diffusible hydrogen content of weld metal to or below 1 cc all at once in the weld metal, and produces weld beads in good form free from weld defects. The combination of Requirement (1) with Requirement (2)-(c) permits production of weld beads in perfect form. Requirement (3) serves to lower the oxygen content of weld metal to or below 300 ppm. The combination of Requirement (2)-(c) with Requirement (4) and Requirement (6) permits the nitrogen content, $\Delta N$, of weld metal to be lowered to or below about 10 ppm. By the combination of Requirement (4) with Requirement (5)-(b), Requirement (5)-(d), and Requirement (6), the diffusible hydrogen content of weld metal is lowered to or below 1 cc/100 g DM. In this case, the fact that both Requirement (5)-(b) and Requirement (5)-(d) are satisfied means that the fused substance has undergone a quick air-cooling treatment and it contains at least 25% of $CaF_2$.

Besides the components so far described, the flux of the present invention may incorporate such components as BaO, MnO, $ZrO_2$, $TiO_2$, $K_2O$, etc. for adjustment of the physical properties of the flux.

In this case, these additional components are required to meet the conditions of basicity (B) recited in Requirement (3) and Requirement (5) and fulfil these requirements. Since $K_2O$ and other similar alkali metal oxides are generally used only in extremely small amounts, they may be left out of the relevant calculations. They may be incorporated suitably in such small amounts. The total amount of these additional components is restricted by the amounts of CaO, MgO, $Al_2O_3$, and $SiO_2$ specified in Requirement (1) and the amount of $CaF_2$ specified in Requirement (2).

Now, the present invention will be described specifically below with reference to following examples.

Table 1 shows chemical compositions of base fluxes, Table 2 welding conditions, and Table 3 alloying metal compositions of steel plate and wire, invariably used in the experiments described below. Table 4 shows the method of treatment and characteristics of flux and the results of experiments.

The raw materials for flux which produce the chemical composition of F-1 were melted in an electric furnace and the melted blend was cooled with air, to give the flux of Example 1. when the same blend was subjected to a quick air-cooling treatment, there was obtained the flux of Example 2. When the cooling was conducted with water, there was obtained the flux of Example 11 (comparative experiment). In Examples 1 and 2, a weld bead was produced in good form and the weld metal had low oxygen content, nitrogen content and diffusible hydrogen content. In Example 11 (comparative experiment), the weld metal had an extremely high diffusible hydrogen content and the weld bead showed pitting.

In Examples 3 and 4, the raw materials for the base flux of F-1 except for the fluorite which was taken as a non-fused substance were melted in an electric furnace and the fused blend was subjected in the one experiment to a water-cooling treatment and in the other to an air-cooling treatment, to afford the fluxes of Examples 3 and Examples 4 respectively. Since the fused substance had amply low basicity, the diffusible hydrogen contents of the weld metal were small. These fluxes posed no problem about the oxygen and nitrogen contents of weld metal and the form of weld bead.

The raw materials for the base flux of F-2 except for the magnesia clinker and the fluorite in their entire amounts and part of the limestone (1.5 cc as reduced in $CO_2$ content) which were removed as a non-fused substance were fused in an electric furnace and the fused blend was subjected in one experiment to a water-cooling treatment and in the other to an air-cooling treatment, to afford the fluxes of Example 5 and Example 6 respectively. The raw materials for the same base flux except for part of the limestone (1.0% as reduced in the $CO_2$ content) which was taken out as a non-fused substance were fused in an electric furnace and the fused blend was subjected to a quick air-cooling treatment, to afford the flux of Example 7. These fluxes posed no problem about oxygen, nitrogen and diffusible hydrogen contents of weld metal, and the form of weld bead. From the raw materials for the base flux of F-2, only the magnesia clinker and the fluorite were taken out as a non-fused substance and processed by following the procedure of Example 6, to afford the flux of Example 13 (comparative experiment). This flux gave a high nitrogen content to the weld metal.

The fluxes of Example 8 and Example 9 were obtained by removing part of the limestone (1.0% as reduced in the $CO_2$ content) as a non-fused substance from the raw materials for the base flux of F-1, melting the remaining raw materials in an electric furnace, and subjecting the molten blend in one experiment to an air-cooling treatment and in the other to a quick air-cooling treatment. The oxygen contents, nitrogen contents, and diffusible hydrogen contents of the weld metal were amply low and the weld bead was in good form free from weld defects.

The flux of Example 10 was obtained by removing the fluorite in the entire amount and part of the limestone (1% as reduced in the $CO_2$ content) as a non-fused substance from the raw materials for the base flux of F-4, melting the remaining raw materials in an electric furnace, and subjecting the molten blend to a quick air-cooling treatment. The oxygen content, nitrogen content, and diffusible hydrogen content of the weld metal were amply low and the weld bead was in good form free from defects. This flux fulfilled the object of this invention.

The flux of Example 12 (comparative experiment) was produced by melting the raw materials for the base flux of F-3 in their entire amounts in an electric furnace and subjecting the molten blend to a quick air-cooling treatment. Because of insufficient CaO, MgO, $SiO_2$, and $Al_2O_3$ contents, the weld bead was in unstable form and sustained undercut.

TABLE 1

| Component | Base flux (%) | | | |
|---|---|---|---|---|
| | F-1 | F-2 | F-3 | F-4 |
| CaO | 13.5 | 17.7 | 9.2 | 19.4 |
| MgO | 4.5 | 19.9 | 3.0 | 0 |
| $Al_2O_3$ | 22.5 | 26.0 | 15.3 | 28.5 |
| $SiO_2$ | 5.4 | 4.8 | 3.7 | 5.3 |
| $CaF_2$ | 49.4 | 17.0 | 51.9 | 27.5 |
| Others | 4.8 | 14.6 | 17.0 | 19.3 |
| Basicity (B) | 3.53 | 3.18 | 3.29 | 3.36 |

TABLE 2

| Electrode | Polarity | Current (A) | Voltage (V) | Speed (cm/min) |
|---|---|---|---|---|
| L | AC | 1350 | 35 | |
| $T_1$ | AC | 950 | 40 | 130 |
| $T_2$ | AC | 780 | 38 | |

TABLE 3

| | C | Si | Mn | P | S (%) |
|---|---|---|---|---|---|
| Steel plate | 0.05 | 0.29 | 1.62 | 0.028 | 0.002 |
| Wire | 0.10 | 0.011 | 2.64 | 0.005 | 0.002 |

TABLE 4

| | Example No. | Base flux | Basicity (B) of flux | Method of cooling of molten blend | Basicity (B) of fused substance | Composition of non-fused substance (proportion to total weight of flux less $CO_2$ component taken as 100) | Oxygen content of weld metal (ppm) | Nitrogen content, ΔN, of weld metal (ppm) | Diffusible hydrogen content (cc/100 g DM) | Appearance of weld bead | Weld defects |
|---|---|---|---|---|---|---|---|---|---|---|---|
| Example of the invention | 1 (first aspect) | F-1 | 3.53 | Air-cooling | 3.53 | — | 128 | 18 | 4.8 | Good | None |
| | 2 (sixth aspect) | F-1 | 3.53 | Quick Air-cooling | 3.53 | — | 110 | 16 | 1.7 | Good | None |
| | 3 (second aspect) | F-1 | 3.53 | Water-cooling | 2.48 | Fluorite 53.9 | 170 | 16 | 5.1 | Good | None |
| | 4 (third aspect) | F-1 | 3.53 | Air-cooling | 2.48 | Fluorite 53.9 | 144 | 14 | 2.8 | Good | None |
| | 5 (fourth aspect) | F-2 | 3.18 | Water-cooling | 2.31 | Magnesia clinker 21.7 Fluorite 18.5 Limestone 3.4 | 138 | 6 | 1.5 | Good | None |
| | 6 (fifth aspect) | F-2 | 3.18 | Air-cooling | 2.31 | Magnesia clinker 21.7 Fluorite 18.5 Limestone 3.4 | 105 | 7 | 0.9 | Good | None |
| | 7 (seventh aspect) | F-2 | 3.18 | Quick air-cooling | 3.15 | Limestone 2.3 | 118 | 13 | 1.0 | Good | None |
| | 8 (eighth aspect) | F-1 | 3.53 | Air-cooling | 3.51 | Limestone 2.3 | 90 | 10 | 1.2 | Good | None |
| | 9 (tenth aspect) | F-1 | 3.53 | Quick air-cooling | 3.51 | Limestone 2.3 | 145 | 3 | 0.8 | Good | None |
| | 10 (ninth aspect) | F-4 | 3.36 | Quick air-cooling | 3.12 | Fluorite 30.0 Limestone 2.3 | 126 | 7 | 1.2 | Good | None |
| Comparative Experiment | 11 | F-1 | 3.53 | Water-cooling | 3.53 | — | — | — | 34.5 | Good | Pitting |
| | 12 | F-3 | 3.29 | Quick air-cooling | 3.29 | — | 166 | 13 | 1.6 | Unstable | Undercut |
| | 13 | F-2 | 3.18 | Air-cooling | 2.50 | Magnesia clinker 21.7 Fluorite 18.5 | 130 | 23 | 3.4 | Good | None |

What is claimed is:

1. A welding flux suitable for submerged arc welding, which comprises CaO, MgO, $Al_2O_3$ and $SiO_2$, wherein the proportions of the above four components to the total amount thereof taken as 100% fall in the following respective ranges:
   CaO: 10 to 60%
   MgO: Not more than 30%
   $Al_2O_3$: 20 to 70%
   $SiO_2$: 5 to 40% and wherein the total amount of said four components accounts for not less than 35% of the total weight of said flux less any $CO_2$ component thereof, said flux further contains $CaF_2$ in an amount of from 25 to 60% of the total weight of said flux less the $CO_2$ component thereof, the basicity (B) of said flux is not less than 1.0 calculated in accordance with the formula (I)

$$B = 6.50N_{BaO} + 6.05N_{CaO} + 4.8N_{MnO} + 4.0N_{MgO} + \quad (I)$$
$$3.4N_{FeO} + 5.1N_{CaF_2} + 0.3N_{ZrO_2} - 0.2N_{Al_2O_3} -$$
$$2.2N_{TiO_2} - 6.3N_{SiO_2}$$

wherein N denotes the mol percentage of the respective components, said flux contains both a fused substance and a non-fused substance, said fused substance has undergone a water-cooling treatment, and the basicity (B) of said fused substance calculated in accordance with the formula (I) is not more than 2.7.

2. A welding flux suitable for submerged arc welding, which comprises CaO, MgO, $Al_2O_3$ and $SiO_2$, wherein the proportions of the above four components to the total amount thereof taken as 100% all in the following respective ranges:
   CaO: 10 to 60%
   MgO: Not more than 30%

Al$_2$O$_3$: 20 to 70%
SiO$_2$: 5 to 40%
and wherein the total amount of said four components accounts for not less than 35% of the total weight of said flux less any CO$_2$ component thereof, said flux further contains CaF$_2$ in an amount of from 25 to 65% of the total weight of said flux less the CO$_2$ component thereof, the basicity (B) of said flux is not less than 1.0 calculated in accordance with the formula (I)

$$B = 6.50N_{BaO} + 6.05N_{CaO} + 4.8N_{MnO} + 4.0N_{MgO} + \quad \text{(I)}$$
$$3.4N_{FeO} + 5.1N_{CaF_2} + 0.3N_{ZrO_2} - 0.2N_{Al_2O_3} -$$
$$2.2N_{TiO_2} - 6.3N_{SiO_2}$$

wherein N denotes the mol percentage of the respective components,
said flux contains both a fused substance and a non-fused substance, said fused substance has undergone an air-cooling treatment, and the basicity (B) of said fused substance calculated in accordance with the formula (I) is not more than 3.0.

3. A welding flux suitable for submerged arc welding, which comprises CaO, MgO, Al$_2$O$_3$ and SiO$_2$, wherein the proportions of the above four components to the total amount thereof taken as 100% fall in the following respective ranges:
CaO: 10 to 60%
MgO: Not more than 30%
Al$_2$O$_3$: 20 to 70%
SiO$_2$: 5 to 40%
and wherein the total amount of said four components accounts for not less than 35% of the total weight of said flux less any CO$_2$ component thereof, said flux further contains CaF$_2$ in an amount of from 15 to 60% of the total weight of said flux less the CO$_2$ component thereof, the basicity (B) of said flux is not less than 1.0 calculated in accordance with the formula (I)

$$B = 6.50N_{BaO} + 6.05N_{CaO} + 4.8N_{MnO} + 4.0N_{MgO} + \quad \text{(I)}$$
$$3.4N_{FeO} + 5.1N_{CaF_2} + 0.3N_{ZrO_2} - 0.2N_{Al_2O_3} -$$
$$2.2N_{TiO_2} - 6.3N_{SiO_2}$$

wherein N denotes the mol percentage of the respective components,
said flux contains both a fused substance and a non-fused substance, said fused substance has undergone a water-cooling treatment, the basicity (B) of said fused substance calculated in accordance with the formula (I) is not more than 2.7, and said non-fused substance contains a carbonate mineral or carbonate minerals in an amount such that the CO$_2$ constituting said carbonate mineral or minerals, as reduced to CO$_2$ gas, accounts for a proportion of from 0.2 to 5.0% of the total weight of said flux less the CO$_2$ component thereof.

4. A welding flux suitable for submerged arc welding, which comprises CaO, MgO, Al$_2$O$_3$ and SiO$_2$, wherein the proportions of the above four components to the total amount thereof taken as 100% fall in the following respective ranges:
CaO: 10 to 60%
MgO: Not more than 30%
Al$_2$O$_3$: 20 to 70%
SiO$_2$: 5 to 40%
and wherein the total amount of said four components accounts for not less than 35% of the total weight of said flux less any CO$_2$ component thereof, said flux further contains CaF$_2$ in an amount of from 15 to 65% of the total weight of said flux less the CO$_2$ component thereof, the basicity (B) of said flux is not less than 1.0 calculated in accordance with the formula (I)

$$B = 6.50N_{BaO} + 6.05N_{CaO} + 4.8N_{MnO} + 4.0N_{MgO} + \quad \text{(I)}$$
$$3.4N_{FeO} + 5.1N_{CaF_2} + 0.3N_{ZrO_2} - 0.2N_{Al_2O_3} -$$
$$2.2N_{TiO_2} - 6.3N_{SiO_2}$$

wherein N denotes the mol percentage of the respective components,
said flux contains both a fused substance and a non-fused substance, said fused substance has undergone an air-cooling treatment, the basicity (B) of said fused substance calculated in accordance with the formula (I) is not more than 3.0, and said non-fused substance contains a carbonate mineral or carbonate minerals in an amount such that the CO$_2$ constituting said carbonate mineral or minerals, as reduced to CO$_2$ gas, accounts for a proportion of from 0.2 to 5.0% of the total weight of said flux less the CO$_2$ component thereof.

5. A welding flux suitable for submerged arc welding, which comprises CaO, MgO, Al$_2$O$_3$ and SiO$_2$, wherein the proportions of the above four components to the total amount thereof taken as 100% fall in the following respective ranges:
CaO: 10 to 60%
MgO: Not more than 30%
Al$_2$O$_3$: 20 to 70%
SiO$_2$: 5 to 40%
and wherein the total amount of said four components accounts for not less than 35% of the total weight of said flux less any CO$_2$ component thereof, said flux further contains CaF$_2$ in an amount of from 15 to 65% of the total weight of said flux less the CO$_2$ component thereof, the basicity (B) of said flux is not less than 1.0 calculated in accordance with the formula (I)

$$B = 6.50N_{BaO} + 6.05N_{CaO} + 4.8N_{MnO} + 4.0N_{MgO} + \quad \text{(I)}$$
$$3.4N_{FeO} + 5.1N_{CaF_2} + 0.3N_{ZrO_2} - 0.2N_{Al_2O_3} -$$
$$2.2N_{TiO_2} - 6.3N_{SiO_2}$$

wherein N denotes the mol percentage of the respective components,
said flux contains both a fused substance and a non-fused substance, said fused substance has undergone a quick air-cooling treatment, and said non-fused substance contains a carbonate mineral or carbonate minerals in an amount such that the CO$_2$ constituting said carbonate mineral or minerals, as reduced to CO$_2$ gas, accounts for a proportion of from 0.2 to 5.0% of the total weight of said flux less the CO$_2$ component thereof.

6. A welding flux suitable for submerged arc welding, which comprises CaO, MgO, Al$_2$O$_3$ and SiO$_2$, wherein the proportions of the above four components to the total amount thereof taken as 100% fall in the following respective ranges:
CaO: 10 to 60%
MgO: Not more than 30%
Al$_2$O$_3$: 20 to 70%
SiO$_2$: 5 to 40%
and wherein the total amount of said four components accounts for not less than 35% of the total weight of said flux less any $CO_2$ component thereof, said flux further contains $CaF_2$ in an amount of from 25 to 65% of the total weight of said flux less the $CO_2$ component thereof, the basicity (B) of said flux is not less than 1.0 calculated in accordance with the formula (I)

$$B = 6.50N_{BaO} + 6.05N_{CaO} + 4.8N_{MnO} + 4.0N_{MgO} + \quad (I)$$
$$3.4N_{FeO} + 5.1N_{CaF_2} + 0.3N_{ZrO_2} - 0.2N_{Al_2O_3} -$$
$$2.2N_{TiO_2} - 6.3N_{SiO_2}$$

wherein N denotes the mol percentage of the respective components,
said flux contains both a fused substance and a non-fused substance, said fused substance has undergone an air-cooling treatment, said fused substance contains $CaF_2$ in an amount of not less than 25% and said non-fused substance contains a carbonate mineral or carbonate minerals in an amount such that the $CO_2$ constituting said carbonate mineral or minerals, as reduced to $CO_2$ gas, accounts for a proportion of from 0.2 to 5.0% of the total weight of said flux less the $CO_2$ component thereof.

7. A welding flux suitable for submerged arc welding, which comprises CaO, MgO, $Al_2O_3$ and $SiO_2$, wherein the proportions of the above four components to the total amount thereof taken as 100% fall in the following respective ranges:
CaO: 10 to 60%
MgO: Not more than 30%
$Al_2O_3$: 20 to 70%
$SiO_2$: 5 to 40% and wherein the total amount of said four components accounts for not less than 35% of the toal weight of said flux less any $CO_2$ components thereof, said flux further contains $CaF_2$ in an amount of from 25 to 65% of the total weight of said flux less the $CO_2$ component thereof, the basicity (B) of said flux is not less than 1.0 calculated in accordance with formula (I)

$$B = 6.50N_{BaO} + 6.05N_{CaO} + 4.8N_{MnO} + 4.0N_{MgO} + \quad (I)$$
$$3.4N_{FeO} + 5.1N_{CaF_2} + 0.3N_{ZrO_2} - 0.2N_{Al_2O_3} -$$
$$2.2N_{TiO_2} - 6.3N_{SiO_2}$$

wherein N denotes the mol percentage of the respective components,
said flux contains both a fused substance and a non-fused substance, said fused substance has undergone a quick air-cooling treatment, and said non-fused substance contains a carbonate mineral or carbonate minerals in an amount such that the $CO_2$ constituting said carbonate mineral or minerals, as reduced to $CO_2$ gas, accounts for a proportion of from 0.2 to 5.0% of the total weight of said flux less the $CO_2$ thereof.

8. A welding flux suitable for submerged arc welding, which comprises CaO, MgO, $Al_2O_3$ and $SiO_2$, wherein the proportions of the above four components to the total amount thereof taken as 100% fall in the following respective ranges:
CaO: 10 to 60%
MgO: Not more than 30%
$Al_2O_3$: 20 to 70%
$SiO_2$: 5 to 40%
and wherein the total amount of the above four components accounts for not less than 35% of the total weight of said flux less any $CO_2$ component thereof, said flux further contains $CaF_2$ in an amount of from 25 to 65% of the total weight of said flux less the $CO_2$ component thereof, the basicity (B) of said flux is not less than 1.0 calculated in accordance with the formula (I)

$$B = 6.50N_{BaO} + 6.05N_{CaO} + 4.8N_{MnO} + 4.0N_{MgO} + \quad (I)$$
$$3.4N_{FeO} + 5.1N_{CaF_2} + 0.3N_{ZrO_2} - 0.2N_{Al_2O_3} -$$
$$2.2N_{TiO_2} - 6.3N_{SiO_2}$$

wherein N denotes the mol percentage of the respective components,
said flux contains both a fused substance and a non-fused substance, said fused substance has undergone a quick air-cooling treatment, said fused substance contains $CaF_2$ in an amount of not less than 25%, and said non-fused substance contains a carbonate mineral of carbonate minerals in an amount such that the $CO_2$ constituting said carbonate mineral or minerals, as reduced to $CO_2$ gas, accounts for a proportion of from 0.2 to 5.0% of the total weight of said flux less the $CO_2$ component thereof.

* * * * *